United States Patent
Clapp, Jr. et al.

(10) Patent No.: US 6,457,874 B1
(45) Date of Patent: Oct. 1, 2002

(54) WALL MOUNTABLE MIXED MEDIA OUTLET

(75) Inventors: Donnie R. Clapp, Jr., Saginaw, TX (US); Mark R. Dagley, Ft. Worth, TX (US); Markus A. Giebel, Hickory, NC (US); Kevin L. Morgan, Paradise, TX (US); Mark D. Walters, Azle, TX (US); Steven R. Baker, Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 133 days.

(21) Appl. No.: 09/652,287

(22) Filed: Aug. 31, 2000

(51) Int. Cl.$^7$ .......................... G02B 6/38; H01R 33/945
(52) U.S. Cl. .......................................... 385/75; 439/577
(58) Field of Search ............................ 385/75, 53, 134; 439/76.1, 535, 536, 577

(56) References Cited

U.S. PATENT DOCUMENTS

| | | | |
|---|---|---|---|
| 5,599,206 A | * 2/1997 | Slack et al. | 439/536 |
| RE37,125 E | * 4/2001 | Carlson et al. | 359/125 |
| 6,350,151 B1 | * 2/2002 | Elliot et al. | 439/535 |

* cited by examiner

Primary Examiner—Khiem Nguyen

(57) ABSTRACT

A mixed media outlet is provided that is capable of being mounted upon a wall and that includes ports that are typically designed to provide separate access to an electrical network and to an optical network. The wall mounted outlet can therefore permit a telephone to be connected to the electrical network, and a computer to be connected to the optical network. Alternatively, the outlet can permit a telephone to also be connected to either the same or a different optical network than the computer. The mixed media outlet includes a housing adapted to be wall mounted and first and second ports that are disposed within openings defined by the housing, such as a data port and a voice port. The mixed media outlet also includes an electro-optic converter connected to the first port for converting between electrical and optical signals such that electrical signals presented at the first port are converted to corresponding optical signals for transmission to an optical network and optical signals delivered by an optical fiber are converted to electrical signals for transmission via the first port to a computer, for example. The mixed media outlet can also include a fiber port for optically interfacing the optical fiber and the electro-optic converter in order to permit optical communication therebetween. While the fiber port can be in the same plane as the data and voice ports, the fiber port can lie in a different plane in some embodiments. Further, the mixed media outlet can include a protective subhousing covering at least the electro-optic converter for protecting the electro-optic converter from electromagnetic interference.

44 Claims, 12 Drawing Sheets

WALL MOUNTABLE MIXED MEDIA OUTLET

FIELD OF THE INVENTION

The present invention relates generally to mixed media outlets that permit connection to optical and, in at least some embodiments, electrical networks and, more particularly, to a wall-mountable mixed media outlet.

BACKGROUND OF THE INVENTION

It is desirable in many applications to transmit signals optically, as opposed to electrically, in view of the increased bandwidth and decreased attenuation offered by optical transmission. For example, it would be desirable to interconnect computers by an optical network since computers oftentimes transmit relatively large quantities of data at a fairly quick rate, which rate would be disadvantageously slowed if the data were instead transmitted via an electrical network. As such, increasingly larger portions of many communication networks are being converted to optical networks. By way of example, the introduction of optical fibers into network architectures has gradually moved from the curb, to the home or office building and now toward the desk.

In those networks in which optical fibers extend to the desk, a conversion must take place to allow a computer or other electronic device (hereinafter generally referenced as a computer) to communicate with the optical network since computers are typically designed to transmit and receive electrical signals. In this regard, most computers include a network interface card through which the computer transmits and receives electrical signals. In computer networks in which optical fibers extend to the desk, however, the conventional network interface card may be replaced by an optical network interface card that converts the electrical signals with which the computer communicates internally to optical signals for transmission via an optical network. Likewise, an optical network interface card converts optical signals that are received by the computer to electrical signals within the computer.

Since most computers are originally constructed to have a network interface card designed to transmit and receive electrical signals, a computer must typically be opened in order to remove the original network interface card and to insert an optical network interface card. Not only is this reconfiguration process somewhat costly and time-consuming, but many network administrators or computer owners do not desire to open their computer for fear of damaging other components of the computer or of voiding the computer's warranty. In addition, most conventional laptop computers do not have a port that would support an optical connection such that it would be physically difficult, if not impossible, to connect most laptop computers to an optical fiber even if an optical network interface card were installed within the laptop computer.

In order to avoid opening computers in order to install an optical network interface card and to accommodate laptop computers that do not generally have a port that would support optical communications, external media converters are utilized to convert between electrical and optical signals. Media converters typically reside between the wall outlet and the computer. As such, the optical network can extend to the wall outlet and can then be optically connected to the media converter by means of a fiber optic jumper. On the other hand, the computer can be connected to the media converter by means of an electrical cable or the like. The media converter then serves to convert optical signals to electrical signals for presentation to the computer and, conversely, to convert electrical signals provided by the computer to optical signals for transmission via the optical network.

Since most media converters reside between the wall outlet and the computer, however, media converters can be somewhat unsightly and may be disadvantageously underfoot. In this regard, media converters typically lie on the floor between the wall outlet and the computer. As such, media converters can be a trip hazard and can otherwise just add to the jumble of wires extending between the computer and various wall outlets. As such, it would be desirable to have an optical network extend as close to a desk as practical without requiring the computer to be opened in order to install an optical network interface card and without requiring an external media converter that resides between the wall outlet and the computer.

While the computer networks within many office buildings are quickly being converted to optical networks, the telephone networks within the same office buildings more commonly remain as electrical networks, i.e., copper networks. In addition to the cost associated with replacing these legacy copper networks with optical networks, the voice signals transmitted by a telephone system do not generally require the bandwidth or the speed demanded by the data signals transmitted via a computer network. As such, most offices have separate outlets for connecting the telephone with the telephone network and for connecting the computer with the computer network. In addition to requiring additional hardware in order to construct the different outlets, an office having a number of different outlets can oftentimes have a rather unsightly appearance as a result of the number of wires and cables connected to the various outlets. As such, it would also be desirable to decrease the number of outlets required to interconnect a telephone and a computer with their respective networks, even in instances in which the telephone network is an electrical network and the computer network is an optical network. In addition, it would be desirable for the outlet to be positioned within an office in such a manner as to be both convenient and only minimally obtrusive.

SUMMARY OF THE INVENTION

A mixed media outlet is therefore provided that is capable of being mounted upon a wall and that includes ports that are generally designed to provide separate access to an electrical network and to an optical network. As such, the same wall mounted outlet can permit a telephone to be connected to the electrical network, and a computer to be connected to the optical network. In some embodiments, however, the mixed media outlet can instead connect the telephone to an optical network. In addition, the mixed media outlet of the present invention includes an electro-optic converter for converting between electrical and optical signals. As such, a computer that is designed to transmit and receive electrical signals, such as a computer that includes a standard electrical network interface card, can communicate, via the outlet and, in particular, the electro-optic converter, with the optical network without having any type of external media converter interposed between the outlet and the computer.

The mixed media outlet includes a housing adapted to be wall mounted and first and second ports that are disposed within an opening defined by the housing. According to one advantageous embodiment, each port includes a plurality of electrically conductive elements and is designed to receive respective electrical connectors. For example, the first port can be a data port for establishing an electrical connection with a conductive element capable of transmitting data signals, such as for establishing an electrical connection with a computer. In addition, the second port can be a voice port that typically electrically connects conductive elements located within and outside of the wall for transmitting voice signals therebetween. In this regard, the voice port can electrically connect a telephone with a telephone network in order to transmit voice signals therebetween.

The mixed media outlet permits connections to both an electrical network and an optical network as a result of the electro-optic converter. In particular, the electro-optic converter is disposed in the housing in electrical communication with at least some of the electrically conductive elements of the first port, typically the data port. The electro-optic converter can therefore convert electrical signals presented at the first port to corresponding optical signals for transmission to an optical network via an optical fiber located within the wall. Conversely, the electro-optic converter can convert optical signals delivered by the optical fiber in the wall to electrical signals for transmission via the first port to a computer, for example. Advantageously, the mixed media outlet also includes a fiber port disposed within the housing and in optical communication with the electro-optic converter. The fiber port is designed to establish communication between an optical fiber within the wall and the electro-optic converter in order to permit optical communication therebetween.

The second port, i.e., the voice port, connects voice transmission elements located within and outside of the wall in order to pass voice signals therebetween. Although the voice transmission elements can be conductive elements as described above, the voice transmission elements can alternately be optical fibers or some combination of optical fibers and conductive elements depending upon the application. In embodiments in which the voice port connects the voice transmission element outside of the wall with an optical fiber within the wall, the voice port can connect the voice transmission element outside of the wall with either the same optical fiber within the wall that is also in communication via the electro-optic converter with the data port or with a different optical fiber within the wall. As such, the mixed media outlet of this embodiment can connect a telephone with either a conventional copper network or an optical network in which the voice signals are typically transmitted as voice over IP or the like.

The mixed media outlet can also include a printed circuit board. In one embodiment, components, such as the first port, the electro-optic converter and the fiber port, are mounted upon only one side of the printed circuit board. As such, the first port and the fiber port of the mixed media outlet of this embodiment lie in the same imaginary plane. However, the mixed media outlet of one advantageous embodiment is designed such that the fiber port and at least one of the first and second ports are disposed in different imaginary planes. In this regard, the fiber port and at least one of the first and second ports can be disposed in respective imaginary planes that intersect one another. Alternatively, in embodiments in which the ports are mounted upon a printed circuit board, the fiber port and at least one of the first and second ports can be mounted upon opposite sides of the printed circuit board in order to lie in different, albeit parallel, planes.

The mixed media outlet can also include a protective subhousing covering at least the electro-optic converter for protecting the electro-optic converter from electromagnetic interference. In order to permit communication with the electro-optic converter, the protective subhousing defines openings through which the first port and the fiber port are exposed. In addition, the protective subhousing of one embodiment, is hingedly connected to at least a portion of the housing to facilitate access to the electro-optic converter and other components within the protective subhousing without completely deconstructing the mixed media outlet.

In one embodiment, the housing includes a base capable of being mounted to an electrical outlet box and a cover mounted to the base. The base defines an opening through which the optical fiber and the conductive elements that are located within the wall can enter the mixed media outlet. The base can also include at least one fiber guide for guiding the optical fiber through the mixed media outlet to the opening defined by the base. In this regard, at least one side of both the base and the cover can be curved to permit the optical fiber to be guided to the opening defined by the base without bending the optical fiber more sharply than a predetermined minimum bend radius. In one embodiment, the cover can also include first and second portions. In this embodiment, the first portion of the cover can enclose an active section of the mixed media outlet that includes the first port, the electro-optic converter and the fiber port, while the second portion of the cover can enclose a passive section of the mixed media that includes the second port.

The mixed media outlet can also include a power port for receiving electrical power from a source outside of the wall. Alternatively, the mixed media outlet can include a terminal block for establishing electrical connection with wiring located within the wall that supplies electrical power.

By including an electro-optic converter, the mixed media outlet of the present invention permits an electronic device, such as a computer, to communicate with an optical network without having to install an optical network interface card within the computer and without requiring an external media converter. In particular, the mixed media outlet of the present invention preferably includes both a voice port for permitting a telephone to be connected with either an electrical or an optical network and a data port for permitting a computer to be connected with an optical network. As such, the mixed media outlet of one advantageous embodiment provides a common outlet for establishing connections to both an optical network and an electrical network. By being mounted upon the wall, the mixed media outlet of the present invention is also unobtrusive and contributes to the aesthetically pleasing appearance of the room or office.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
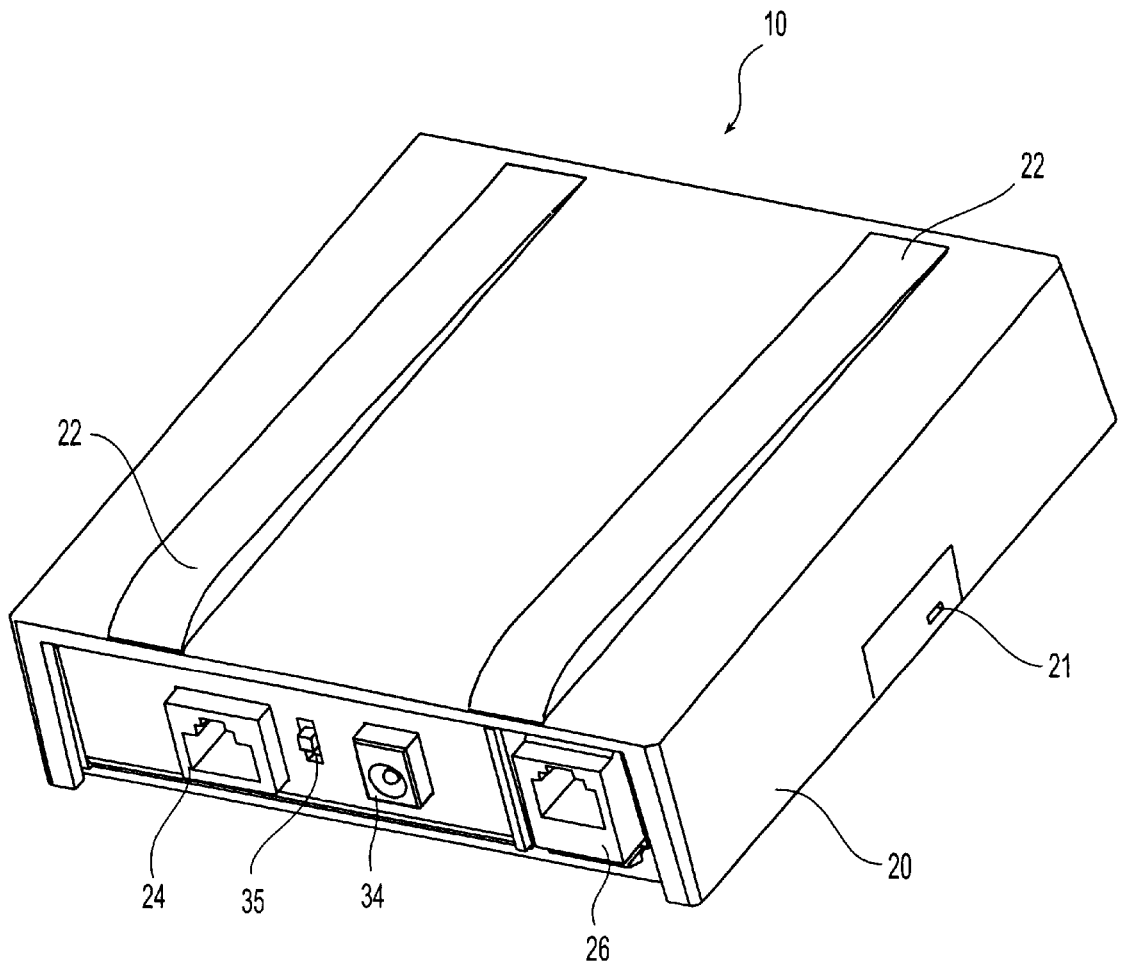
FIG. 1 is a perspective view of a mixed media outlet according to one embodiment of the present invention.

Referring now to FIG. 1, the mixed media outlet 10 that is capable of being mounted upon a wall is depicted. Although the mixed media outlet can be mounted to the wall in a variety of manners, the mixed media outlet is typically mounted to an electrical outlet box 12, as discussed in more detail below. By being mounted on the wall, the mixed media outlet is quite unobtrusive and generally contributes to the aesthetically pleasing appearance of the room or office. In addition, by incorporating elements, such as a media converter, that might otherwise lie upon the floor of a room or office between an outlet and the computer or other electronic device, the wall mountable mixed media outlet of the present invention also serves to eliminate trip hazards.

Figure 2:
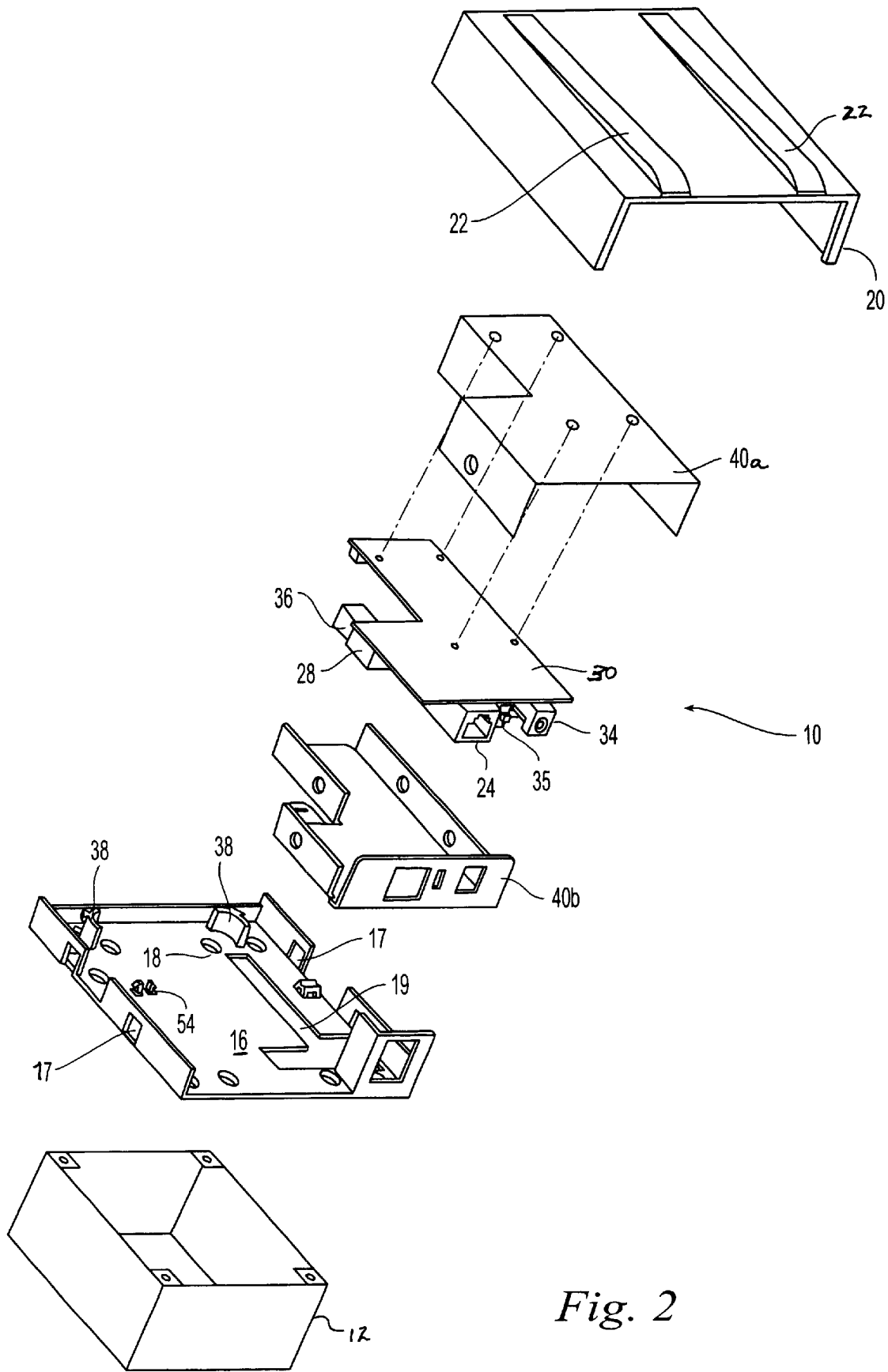
FIG. 2 is an exploded perspective view of the mixed media outlet of FIG. 1.

The mixed media outlet 10 includes a housing adapted to be wall mounted. As shown in FIG. 2, the housing generally includes a base 16 that is capable of being mounted to an electrical outlet box 12. In this regard, the base defines a plurality of openings 18 corresponding to respective openings defined by the electrical outlet box such that the base and the electrical outlet box can be connected by means of a number of threaded fasteners or other connectors that extend through the respective openings. The base depicted in FIG. 2 is designed to be mounted to not only a single gang outlet box, but also on a double gang outlet box, if so desired. Although the base can be formed of various materials, such as sheet metal, the base is typically formed of a plastic so as to be relatively inexpensive and to provide at least some shielding from electromagnetic interference, as described below.

As also shown in FIG. 2, the base 16 further defines an opening 19, such as an L-shaped opening. In embodiments in which the base is mounted to an electrical outlet box 12, the opening provides access to the electrical outlet box. As such, optical fibers and conductive elements, i.e., wires, that are located within the wall and that extend into the electrical outlet box can enter the mixed media outlet via the opening defined by the base. While the base of the illustrated embodiment defines a single opening, the base can define a plurality of openings, if so desired.

In addition to the base 16, the housing of this embodiment also generally includes a cover 20 mounted to the base. Although the cover can be mounted to the base in a variety of manners, the cover is typically snap-fit to the base. In this regard, the upstanding edge portions of the base typically define windows 17 for engaging corresponding tabs carried by the cover. The cover can also be formed of a metal or a conductive plastic in order to provide at least some shielding from electromagnetic interferences as described below. However, the cover is typically formed of a plastic, such as a polycarbonate. Since the exterior surface of the cover will be visible once the mixed media outlet 10 is mounted to the wall, the cover preferably has a desirable exterior appearance and, in the illustrated embodiment, includes a pair of outwardly projecting ribs 22. By projecting outwardly from the remainder of the cover, the ribs are designed to make contact with objects approaching the mixed media outlet in order to protect the remainder of the cover and the mixed media outlet from damage as a result of contact between an object and the mixed media outlet. While the major surface of the cover of the illustrated embodiment is designed to be generally parallel to the wall once the mixed media outlet has been mounted upon the wall, the mixed media outlet can be designed such that the major surface of the cover is positioned at an angle, such as 15° or the like, with the wall with lower portions of the outlet protruding further from the wall than upper portions of the outlet.

The mixed media outlet 10 also includes first and second ports 24, 26 disposed within an opening defined by the housing. In the illustrated embodiment, the first and second ports are disposed within an opening defined by a lower side of the housing such that the first and second ports are downwardly facing. Each port is designed to receive a respective connector, most commonly an electrical connector. In one embodiment, each port can therefore include a plurality of electrically conductive elements. While the first and second port can be a number of different ports, the first port of the illustrated embodiment is an RJ-45 port and the second port of the illustrated embodiment is an RJ-11 port for establishing connection with electrical conductors that are terminated with RJ-45 and RJ-11 connectors, respectively. While the first and second ports of the illustrated embodiment are different types of port, i.e., an RJ-45 port and an RJ-11 port, the first and second ports can be the same type of port, if so desired.

As described in detail below, the first port 24 is designed to permit an electronic device, such as a computer, to interconnect with an optical network and, more particularly, with an optical fiber that is routed through the wall and into the mixed media outlet 10, typically via the opening 19 defined by the base 16. Since the first port is generally utilized to connect a computer to an optical network in order to transmit and receive substantial quantities of data via the optical network, the first port can be referred to as a data port. In contrast, the second port 26 of the embodiment illustrated in FIG. 1 is generally designed to permit a device, such as a telephone, to communicate with an electrical network and, in particularly, with conductive elements that extend through the wall and into the mixed media outlet, also typically via the opening defined by the base. Since the second port of this embodiment typically interconnects the telephone with an electrical network in order to transmit voice signals therebetween, the second port is generally referred to as a voice port. As such, the mixed media outlet of this advantageous embodiment preferably includes ports for permitting communication with both an optical network and an electrical network, thereby reducing the number of outlets that must be installed within a single room or office and correspondingly improving the overall appearance of the room or office.

In order to permit the electronic device, such as a computer, to communicate with the optical network via the first port 24, the mixed media outlet 10 also includes an electro-optic converter 28, also known as a media converter, positioned within the housing. Although the mixed media outlet can include a variety of electro-optic converters, the electro-optic converter of one embodiment includes a transceiver as well as associated conditioning electronics as known to those skilled in the art. The transceiver is preferably sized to accommodate the rate at which data is expected to be transmitted. For example, the transceiver may be a 10 megabit transceiver in instances in which the mixed media outlet serves as a ethernet converter for converting 10Base-T to 10Base-FL. Alternatively, the fiber port may be 100 megabit transceiver in instances in which the mixed media outlet is an ethernet converter for converting 100Base-TX to 100Base-FX. Regardless of the type of electro-optic converter, the electro-optic converter converts between electrical and optical signals. As such, the electro-optic converter is disposed in electrical communication with at least some of the electrically conductive elements of the first port and, in turn, with the electronic device electrically connected to the first port. In addition, the electro-optic converter is disposed in optical communications with an optical fiber that extends through the wall and into the mixed media outlet. As such, the electro-optic converter can convert electrical signals received via the first port from the electronic device into corresponding optical signals for propagation throughout the optical network. Conversely, the electro-optic converter can also convert optical signals received via the optical fiber from the optical network into corresponding electronic signals for transmission to the electronic device.

Figure 5A:
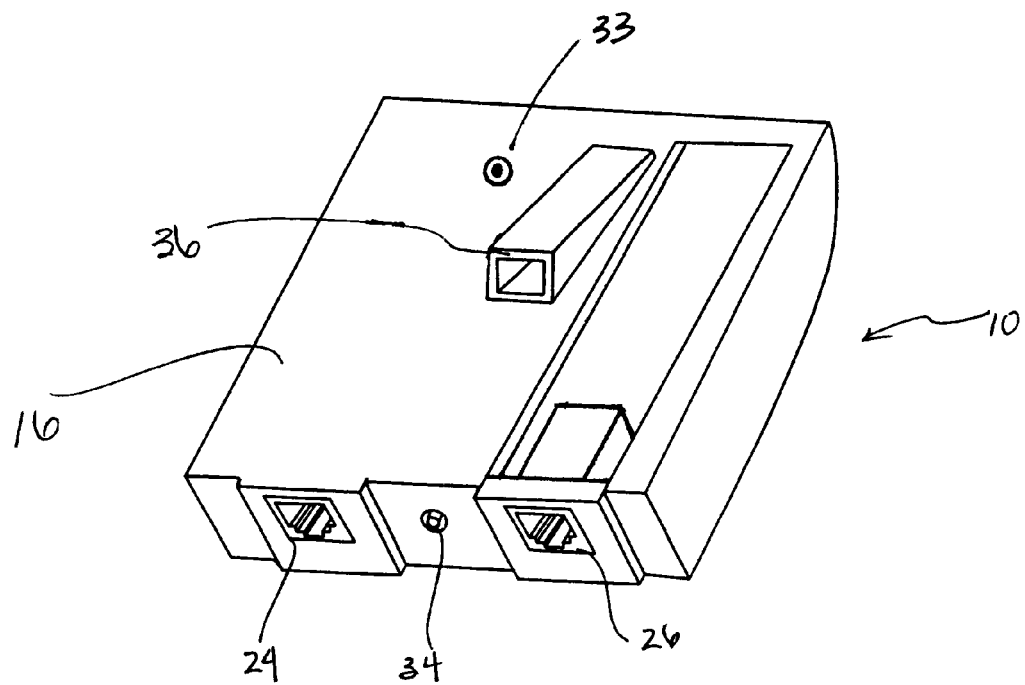
FIGS. 5a and 5b are perspective views of a mixed media outlet according to another embodiment of the present invention taken from opposite sides thereof.

As depicted in FIG. 2, the mixed media outlet 10 typically includes a printed circuit board 30 upon which the electro-optic converter 28 and, in many instances, the first port 24 are mounted. As such, the electrically conductive elements of the first port and the electro-optic converter can be connected by means of electrical traces defined upon or within the printed circuit board. In addition to the first port and the electro-optic converter, a number of other components can be mounted upon the printed circuit board. In this regard, an electro-optic converter generally requires DC power in order to operate. As such, components designed to provide DC power to the electro-optic converter can also be mounted upon the printed circuit board. In one embodiment, DC power is provided by means of the electrical wiring extending through the wall and into the mixed media outlet, such as via power port 33 as depicted in FIG. 5a. As such, the mixed media outlet can include a terminal block, typically mounted upon the printed circuit board, for establishing electrical connection with one or more of the conductive elements that extend through the wall and that supply electrical power. The terminal block can then be connected to the electro-optic converter by means of conductive traces defined upon or within the printed circuit board. Alternatively, the electro-optic converter can be supplied with power from an external source. As such, the mixed media outlet can include a power port 34, such as a DC input jack, for establishing connection with a power supply located outside of the wall, such as a DC power supply or a DC power adapter. The power port of this embodiment is also typically electrically connected to the electro-optic converter by means of conductive traces defined upon or within the printed circuit board. While the mixed media outlet could have either a terminal block or a power port for receiving electrical power from within the wall and from outside the wall, respectively, the mixed media outlet can include both a terminal block and a power port to increase the operational flexibility of the mixed media outlet by permitting the mixed media outlet and, in particular, the electro-optic converter to receive power from either the electrical wiring extending through the wall or from an external power supply.

In addition, the mixed media outlet may also include a switch 35 that toggles between enabling and disabling an auto-sensing feature, if that feature is included on the board. The switch allows the operator of the outlet to disable the auto-sensing feature, eliminating the possibility that the transmission equipment misinterprets any synchronization signals from the board as a corrupted or incorrect signal, which may cause premature termination of data from the equipment.

In order to permit the electro-optic converter 28 to optically communicate with the optical fiber that extends into the mixed media outlet 10, the mixed media outlet also advantageously has a fiber port 36 that is disposed within the housing. Like the first port 24, the fiber port is generally mounted upon the printed circuit board 30, as described in more detail below. The fiber port is designed such that the optical fiber that extends through the wall and into the mixed media outlet can be connected to the fiber port. Likewise, the fiber port can be connected to the electro-optic converter, thereby establishing optical communications between the electro-optic converter and the optical fiber. Although the fiber port can be embodied in a variety of different manners, the fiber port is typically a relatively standard fiber port, such as an MT-RJ fiber port designed to receive an MT-RJ connector that has been mounted upon the end of the optical fiber.

In any event, the mixed media outlet 10 serves to establish communications between the optical fiber that extends through the wall and is connected to the fiber port 36 and the conductive elements that are plugged into the first port 24. As such, the electrical signals produced by an electronic device, such as a computer, can be converted to optical signals by the mixed media outlet and transmitted to an optical network by means of the optical fiber that extends into the mixed media outlet. Conversely, optical signals provided by the optical network for the computer can be converted into corresponding electrical signals by the electro-optic converter 28 and transmitted to the computer by means of the conductive elements extending between the computer and the first port.

Figure 3:
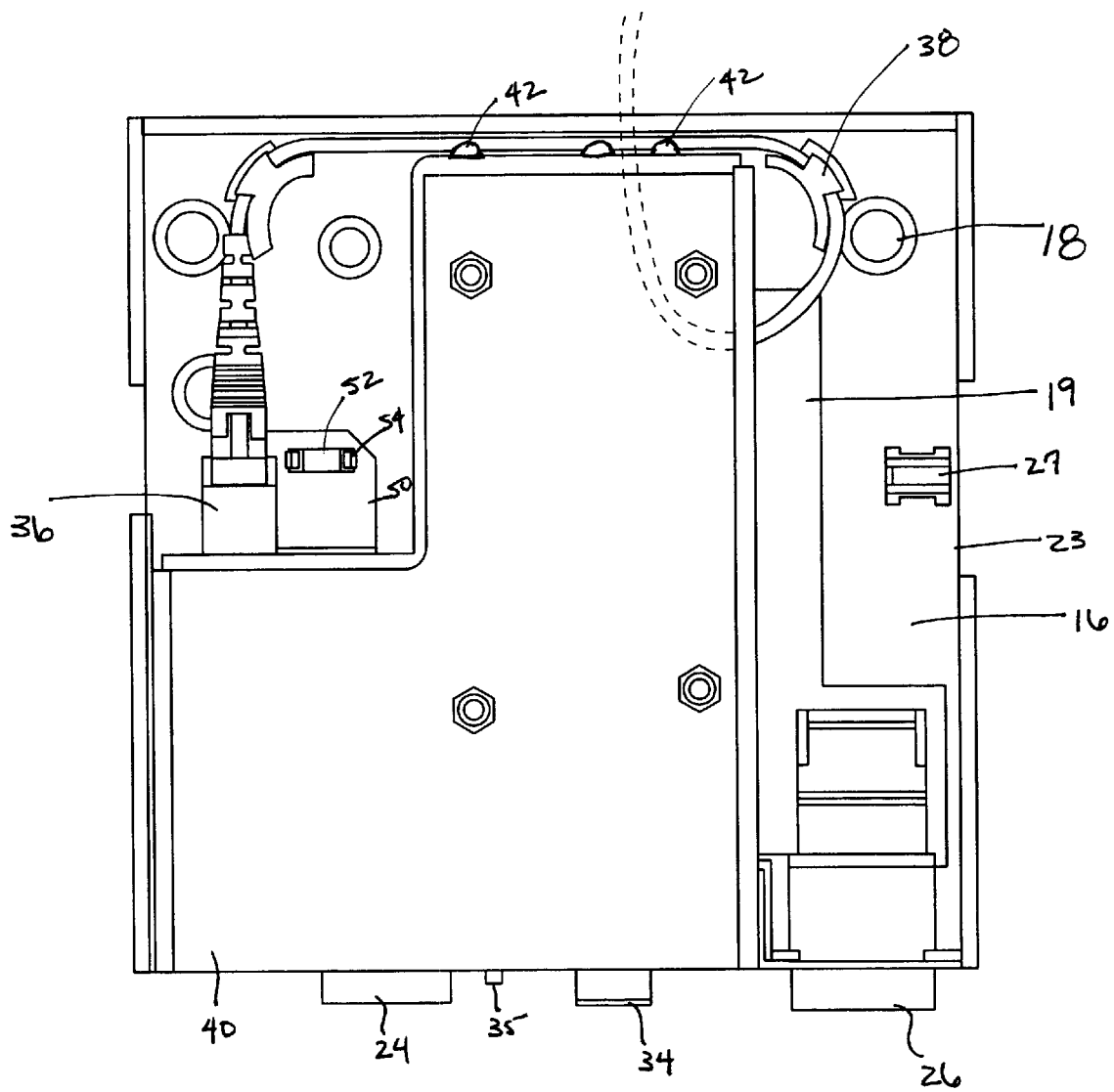
FIG. 3 is a top plan view of the mixed media outlet of FIG. 1 with the cover removed to illustrate the routing of an optical fiber through the mixed media outlet.
Figure 3A:
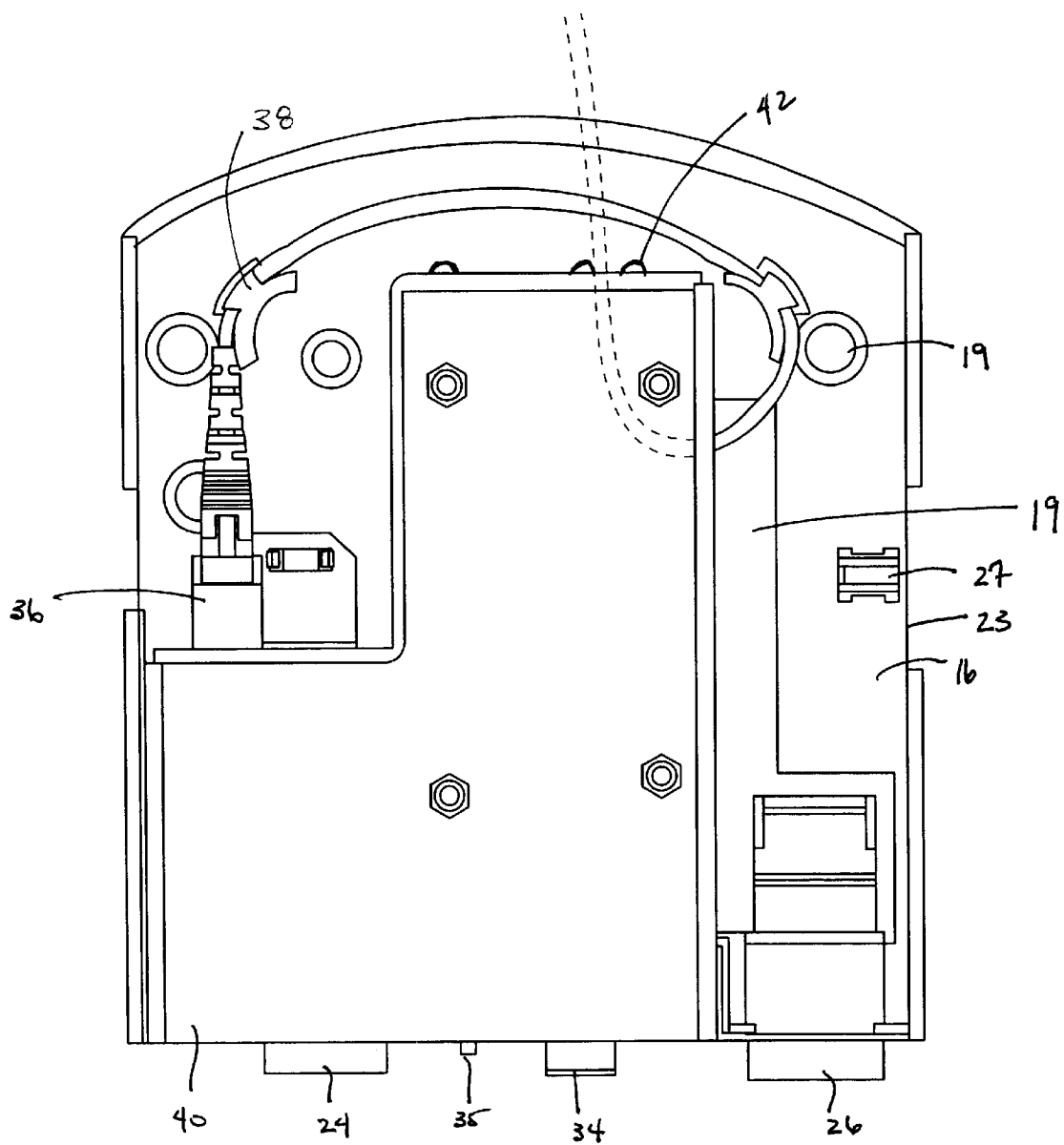
FIG. 3a is a top plan view of an alternative embodiment of a mixed media outlet in which the cover has been removed to illustrate the routing path of an optical fiber and in which the base has a curved side to prevent undesirable bending of the optical fiber.

As shown in FIG. 3 in which the cover 20 has been removed, the optical fiber extends into the mixed media outlet 10 via the opening 19 defined by the base 16. The optical fiber is then preferably guided through the mixed media outlet to the fiber port 36. In order to advantageously manage the optical fiber within the mixed media outlet, the base can include at least one fiber guide 38, such as an upstanding guide member, about which the optical fiber is routed. More typically, the base includes a pair of spaced fiber guides about which the optical fiber is routed. Since the optical fiber must be turned or bent somewhat between the entry of the optical fiber through the opening defined by the base and the connection of the optical fiber to the fiber port, the housing including the base and the cover 20 can be designed such that at least one side of both the base and the cover is curved. See FIG. 3*a* in which the cover has been removed. As such, the optical fiber can extend from the opening defined by the base to the fiber port without being bent more sharply than a predetermined minimum bend radius. Typically, the housing of this embodiment is designed such that the curved side is the upwardly facing side of the mixed media outlet once the mixed media outlet has been mounted upon the wall. Although an embodiment of the mixed media outlet is illustrated and described in which the fiber guides are carried by the base, the fiber guides can, instead, be carried by the cover, the protective subhousing 40 or can be separate components that are held in place once the mixed media outlet is assembled, if so desired.

The multi-media outlet 10 can also include one or more light sources 42, such as light emitting diodes, mounted upon the printed circuit board 30, such as along an edge portion of the printed circuit board, to provide status indications. See FIG. 4 in which the cover 20 has also been removed. As such, the cover preferably defines openings 44 through which the light emitting. diodes are exposed so as to be visibly seen once the mixed media outlet has been mounted upon a wall. Although the mixed media outlet can be designed such that the light emitting diodes provide status indications for a variety of different conditions, the mixed media outlet of one embodiment that is designed to convert between 10Base-T and 10Base-FL includes light emitting diodes that provide status indications that represent that power is supplied to outlet, that 10Base-T receive activity is detected, that 10Base-FL receive activity is detected, that the 10Base-T link is operating normally and that the 10Base-FL link is operating normally. In order to appropriately illuminate the light emitting diodes, the mixed media outlet can include a microprocessor or other electronic circuitry for evaluating the various status conditions and supplying current to the light emitting diodes, as required for illumination. Typically, the microprocessor or other electronic circuitry is also mounted upon the printed circuit board.

In addition to the first port 24, the electro-optic converter 28, the power port 34, the terminal block, the fiber port 36 and the light emitting diodes 42, various other components can be mounted upon the printed circuit board 30 in order to appropriately condition the signals. As known to those skilled in the art, these components can include, for example, one or more capacitors, inductors, and diodes. As illustrated in FIG. 2, the components can be mounted upon only one side the printed circuit board in order to simplify the design of the printed circuit board. Alternatively, the component can be mounted upon opposite sides of the printed circuit board, if so desired.

Figure 5B:
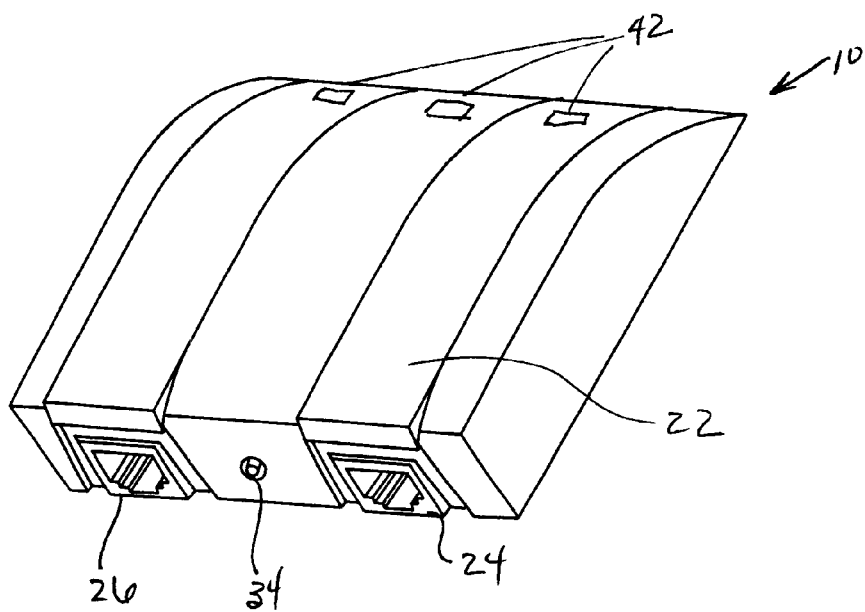

The mixed media outlet 10 can be designed such that the first and second ports, 24, 26 and the fiber port 36 lie in the same imaginary plane, such as in the embodiment depicted in FIG. 2 in which the first and second ports and the fiber port are mounted upon the same side of the printed circuit board 30. However, the mixed media outlet of one advantageous embodiment includes a fiber port that is disposed or lies in a different imaginary plane than at least one of the first and second ports. As mentioned above, the fiber port can be mounted upon the opposite side of the printed circuit board from at least one and, more commonly, both of the first and second ports. As illustrated in FIGS. 5*a* and 5*b*, for example, the fiber port can be designed so as to extend at an angle through the base 16 of the mixed media outlet. As described above in conjunction with other embodiments, however, the first and second ports of this embodiment are mounted upon the printed circuit board so as to extend parallel to the imaginary plane of the printed circuit board and, in turn, to the base of the mixed media outlet. Thus, the fiber port of the mixed media outlet of this embodiment lies in an imaginary plane that intersects the imaginary plane in which the first and second ports lie. In one embodiment, for example, the fiber port is disposed at an acute angle relative to the first and second ports. However, the fiber port can be disposed at other angles relative to the first and second ports, if so desired.

In order for the electro-optic converter 28 to function properly, the electro-optic converter must be substantially protected from electromagnetic interference (EMI). The mixed media outlet 10 therefore also preferably includes a protective subhousing 40 that covers at least the electro-optic converter for protecting the electro-optic converter from EMI. More typically, the protective subhousing covers the printed circuit board 30 upon which the electro-optic converter, as well as other active components, are mounted. In order to permit communication with the electro-optic converter, however, the protective subhousing generally defines openings through which the first port 24, i.e., the data port, and the fiber port 36 are exposed. In addition, the protective subhousing preferably defines openings through which the light emitting diodes are exposed. Although the protective subhousing can be formed of different materials that provide EMI shielding, the protective subhousing is typically formed of a metal, such as galvanized steel or aluminum. In order to enclose the printed circuit board, the protective subhousing is commonly formed of first and second portions 40*a*, 40*b*. The printed circuit board can therefore be placed inside of and connected to the first portion, such as by means of fasteners or other connectors that extend through corresponding openings in the first portion of the protective subhousing and the printed circuit board. The first portion of the protective subhousing with the printed circuit board mounted therewithin can then be connected to the second portion of the protective subhousing by means of fasteners or connectors that extend through corresponding openings in the first and second portions.

Figure 6:
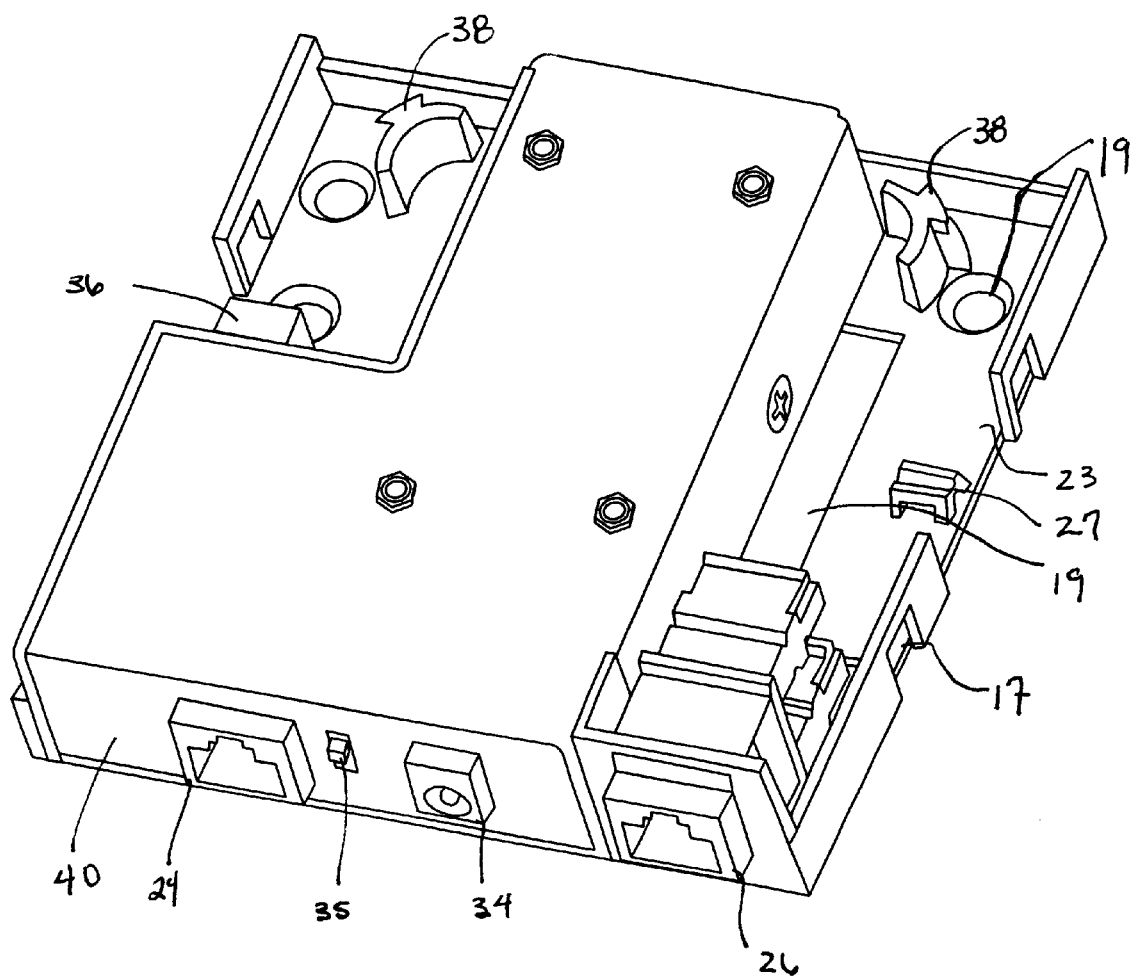
FIG. 6 is another perspective view of the mixed media outlet of FIG. 1 with the cover removed.

In order to mount the mixed media outlet 10 of the above-described embodiment upon a wall, at least one optical fiber and at least one conductive element are initially pulled through the opening 19 defined by the base 16 and the base is mounted to an electrical outlet box 12, such as a double or single gang electrical outlet box 12 depending upon the size of the mixed media outlet. Thereafter, the printed circuit board 30 is positioned within the first portion 40*a* of the protective subhousing 40 such that the first and second ports 24, 26 and the fiber port 36 protrude through respective openings defined by the protective subhousing. After joining the first and second portions of the protective subhousing, the protective subhousing is mounted to the base as shown in FIG. 6. Although the protective subhousing can be mounted to the base in a variety of manners, the protective subhousing of one embodiment includes a tongue 50 defining an opening 52 that is engaged by corresponding clips 54 extending outwardly from the base. See FIG. 4. After connecting the optical fiber to the fiber port and the conductive element to the second port, the cover 20 can then be mounted, such as by means of a snap fit or the like, to the base so as to cover the protective subhousing and the base and to provide an aesthetically pleasing appearance.

Figure 4:
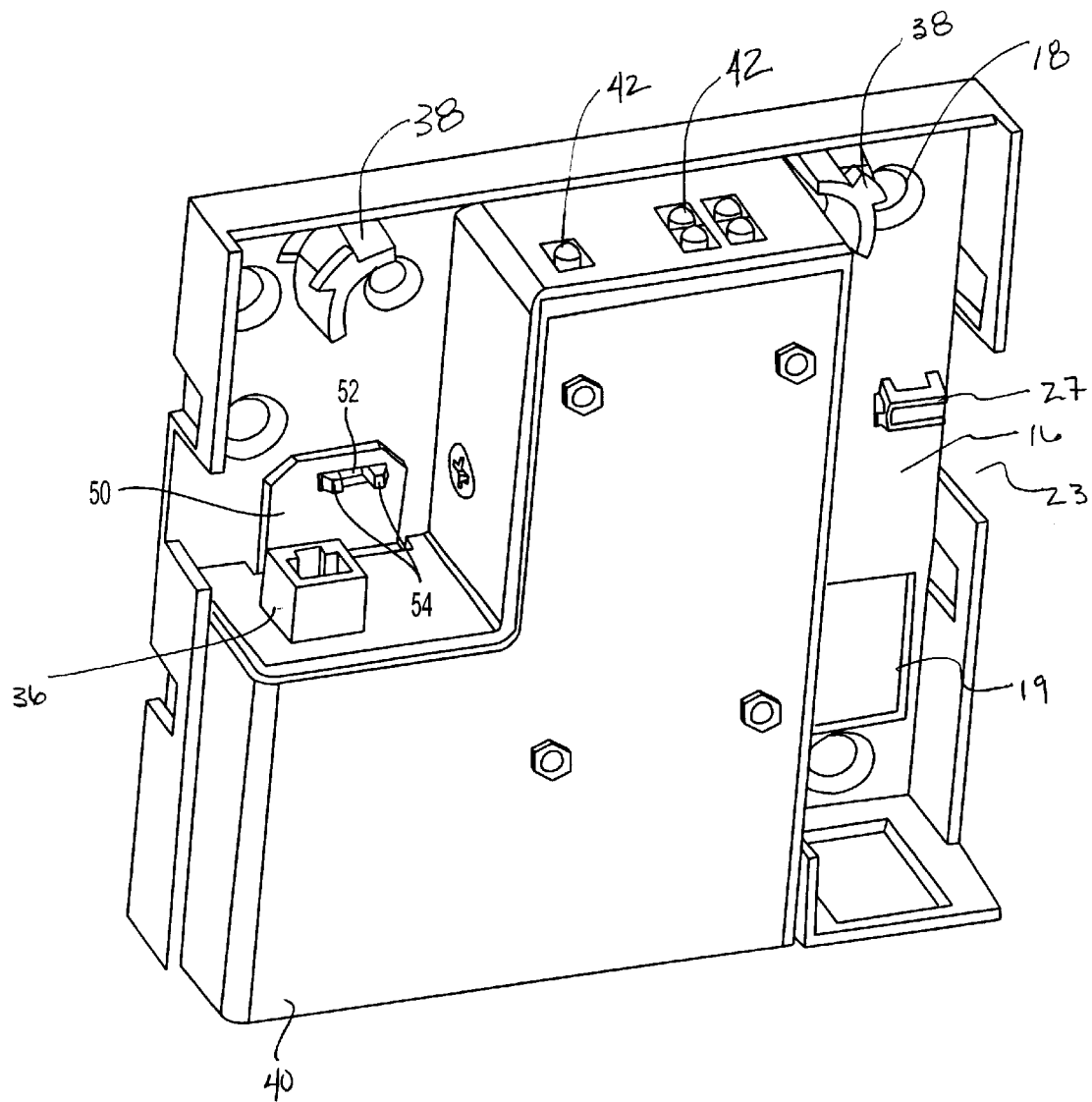
FIG. 4 is a perspective view of the mixed media outlet of FIG. 1 with the cover removed to illustrate the various status indications.

The mixed media outlet 10 can not only be mounted upon a permanent wall, but can also be mounted to modular furniture, i.e., cubicles and the like. If mounted to modular furniture, the optical fibers and the conductive elements may not generally enter the mixed media outlet from the rear through the opening 19 defined by the base 16. Instead, as a result of the standard configuration of modular furniture, the optical fibers and the conductive elements will typically enter the mixed media outlet through an opening in a sidewall of the outlet. In this regard, a sidewall of the cover 20 can include a knock out 21 that is removed. Once the knock out is removed, the opening defined by the sidewall of the cover is aligned with a corresponding opening 23 defined by the base. As such, optical fibers and conductive elements can enter the mixed media outlet through the corresponding openings in the sidewall of the outlet for connection to the fiber port 36 and the second port 26, respectively. As shown in FIGS. 3, 4 and 6, the base can also include a clip 27 to secure the optical fibers to the base in order to advantageously provide fiber management.

Figure 7:
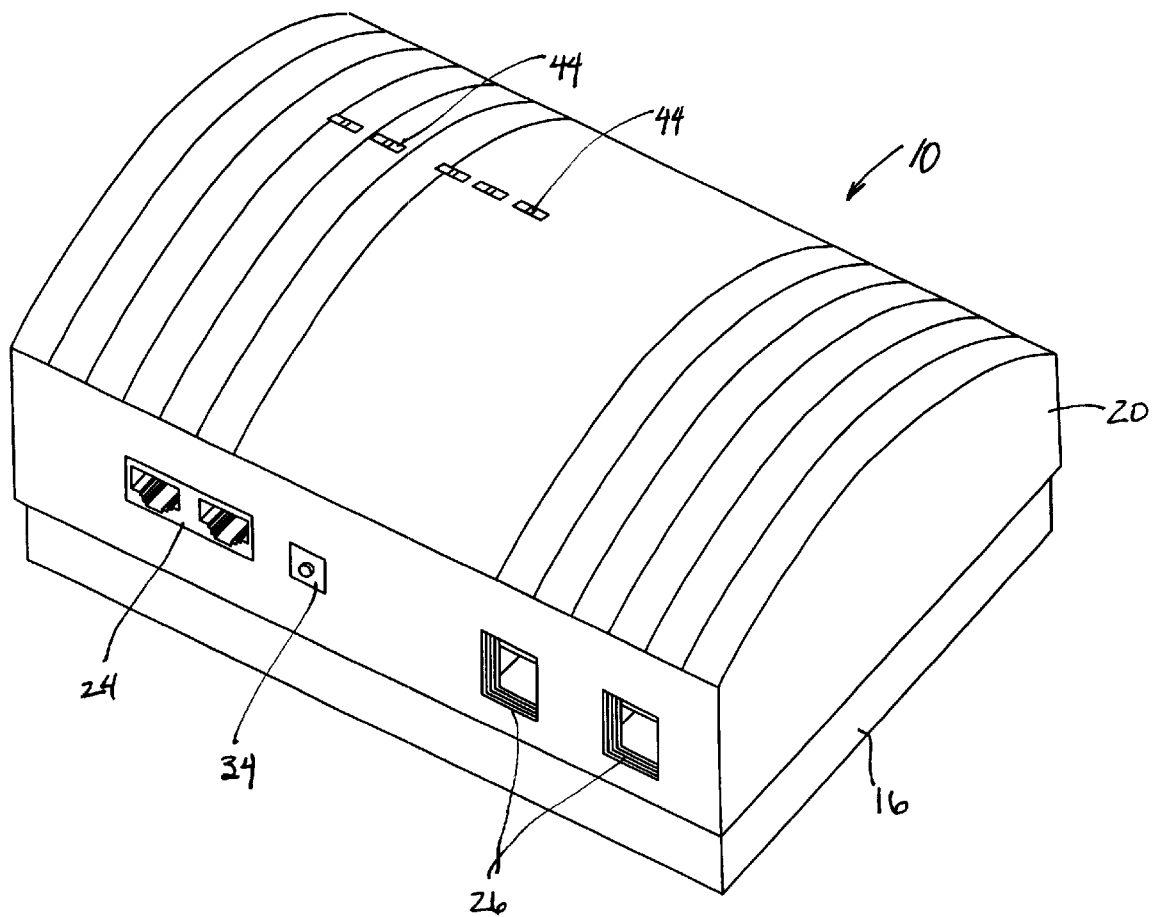
FIG. 7 is a perspective view of a mixed media outlet according to another embodiment of the present invention.
Figure 8:
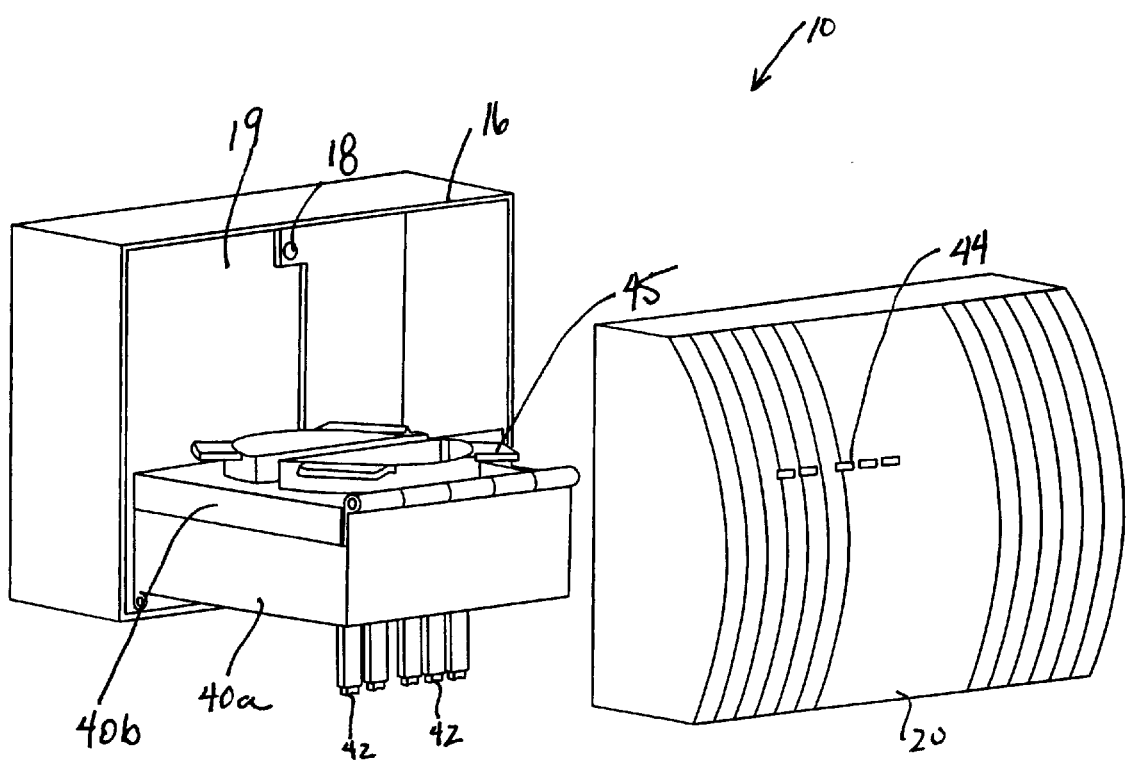
FIG. 8 is an exploded perspective view of the mixed media outlet of FIG. 7 illustrating the hinged connection of the protective subhousing to the base.
Figure 9:
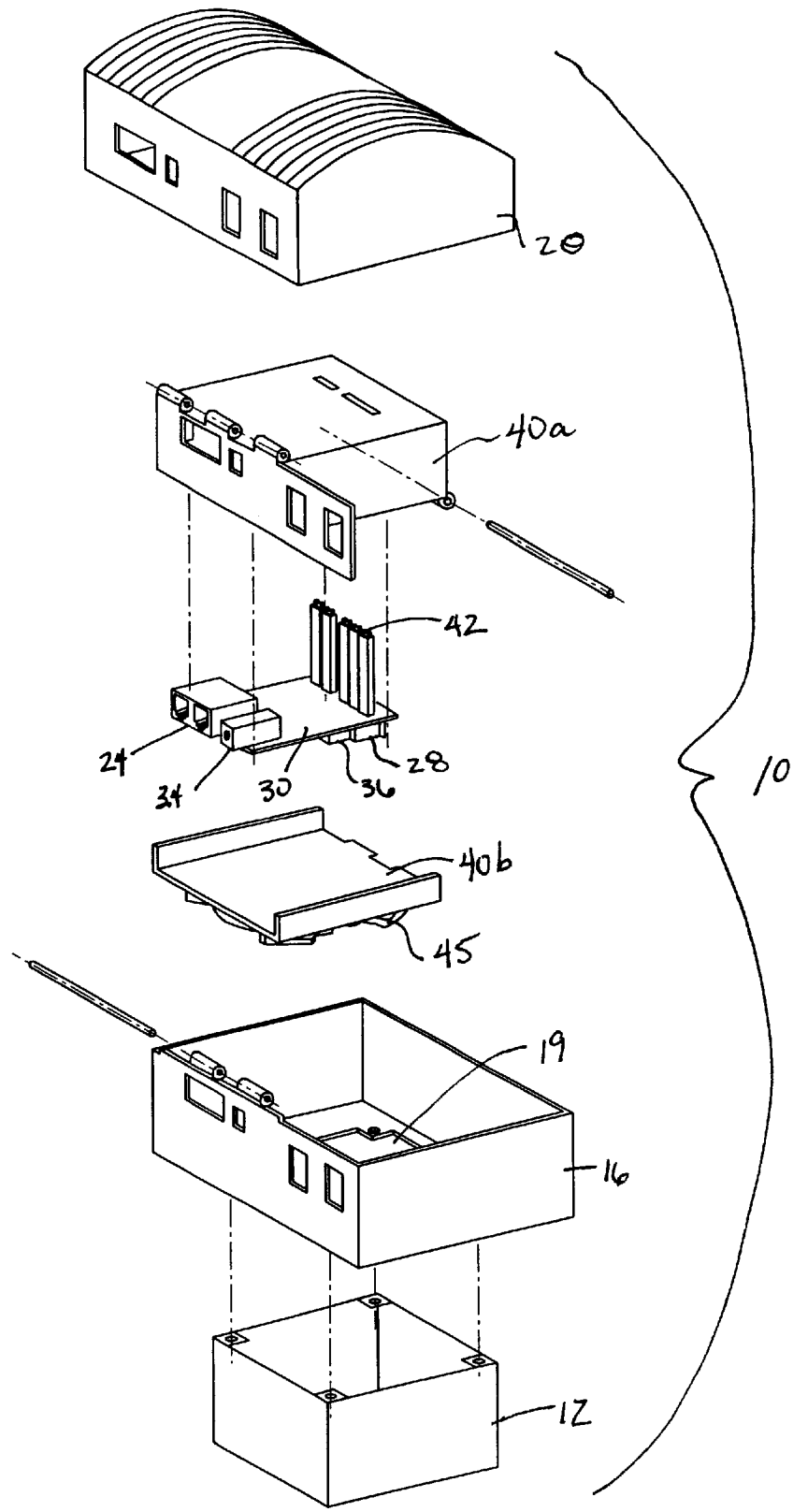
FIG. 9 is a further exploded perspective view of the mixed media outlet of FIG. 7.

Although the embodiment of the mixed media outlet 10 described above and illustrated in FIGS. 1–4 and 6 is advantageous since the number of parts is relatively low and the corresponding manufacturing costs and the time required for assembly is relatively low, the mixed media outlet can be designed in a variety of other fashions without departing from the spirit and scope of the present invention. For example, as shown in FIGS. 7–9, the mixed media outlet can be designed such that the protective subhousing 40 and the printed circuit board 30 are hingedly connected to the base 16 in order to facilitate inspection or repair of the printed circuit board or the components mounted thereupon without completely deconstructing the mixed media outlet. In order to further facilitate inspection or repair, the first and second portions 40a, 40b of the protective subhousing can also be hingedly connected as shown in FIGS. 8 and 9. As shown in this embodiment, the mixed media outlet can also include slack storage. For example, the protective subhousing can include a hub 45 about which slack lengths of optical fiber is wrapped. Although the other embodiments of the mixed media outlet are not depicted to include slack storage capabilities, any embodiment of the mixed media outlet can include slack storage, such as shown in FIGS. 8 and 9, if so desired.

In another embodiment, the mixed media outlet 10 is designed such that a separate protective subhousing 40 is not required. In this embodiment, the cover 20 is formed of a material that provides protection from EMI. For example, the cover can be formed of a metallized plastic that protects the printed circuit board 30 and the components mounted thereupon from EMI.

In the embodiment described heretofore, the second port 26, i.e., the voice port, has been described to interconnect the conductive element coming from the telephone with an electrical network, i.e., an existing copper telephone network. In general terms, however, the voice port is designed to connect voice transmission elements located within and outside of the wall for passing voice signals therebetween. As such, in the above-described embodiment, both voice transmission elements are conductive elements, i.e., wires. However, one or both of the voice transmission elements can be an optical fiber. Thus, the voice port can be designed to connect optical fibers located both within and outside of the wall for passing voice signals therebetween. Alternatively, the voice port can be designed to interconnect a conductive element outside of the wall, i.e., the wire leading from the telephone, to an optical fiber or, more particularly, an optical network within the wall. In this embodiment, the voice port is connected to an electro-optic converter, such as the same electro-optic converter 28 that is connected to the data port 24, in order to convert electrical signals to optical signals and visa versa. In addition, although the voice port can be connected to a different optical fiber within the wall than the optical fiber with which the data port communicates, both the voice port and the data port can be connected or otherwise disposed in communication with the same optical fiber, typically by means of an optical coupler or the like. Thus, the mixed media outlet 10 of this embodiment is particularly advantageous for voice signals transmitted as voice over IP or the like, such as employed by converged networks that serve both computers and telephonic equipment.

The mixed media outlet 10 is typically divided into a passive section and an active section. In embodiments of the mixed media outlet that include a passive section, the voice transmission elements that extend through the wall and into the mixed media outlet. via the opening 19 defined by the base 16 are connected to the second port 26 for connection, in turn, to a device, such as a telephone, via the same type of voice transmission elements. As such, the voice transmission elements typically serve to transmit voice signals for a telephone system or the like. In contrast to the passive portion, the active portion includes the printed circuit board 30 and those components mounted upon the printed circuit board, such as the electro-optic converter 28, that require power for operation. As described above, the components mounted upon the printed circuit board are principally designed to interconnect an optical fiber that extends through the wall and into the mixed media outlet with conductive elements that are connected to the first port 24, typically for the exchange of data for a computer network or the like.

Figure 10:
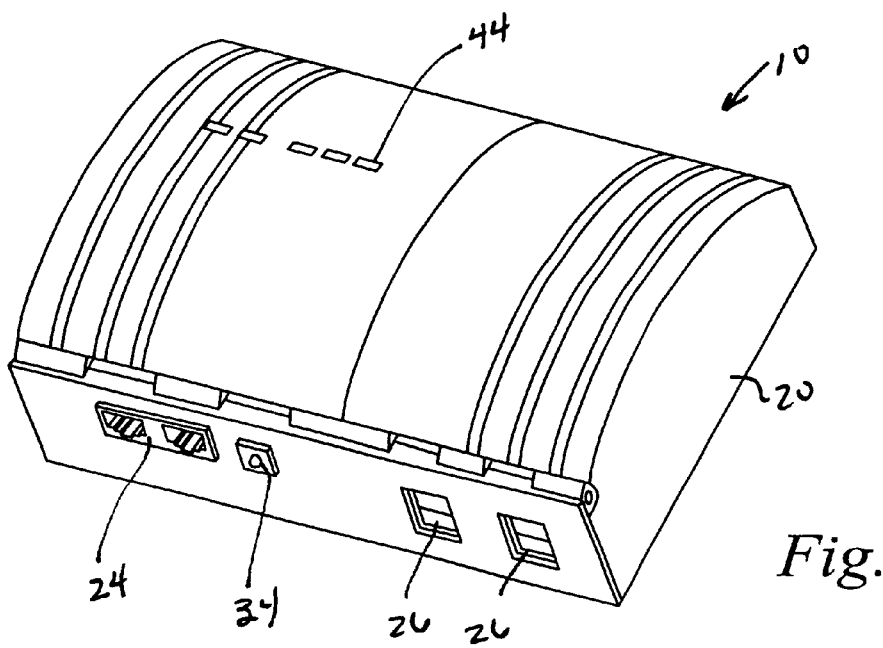
FIG. 10 is a perspective view of a mixed media outlet according to yet another embodiment of the present invention.
Figure 11:
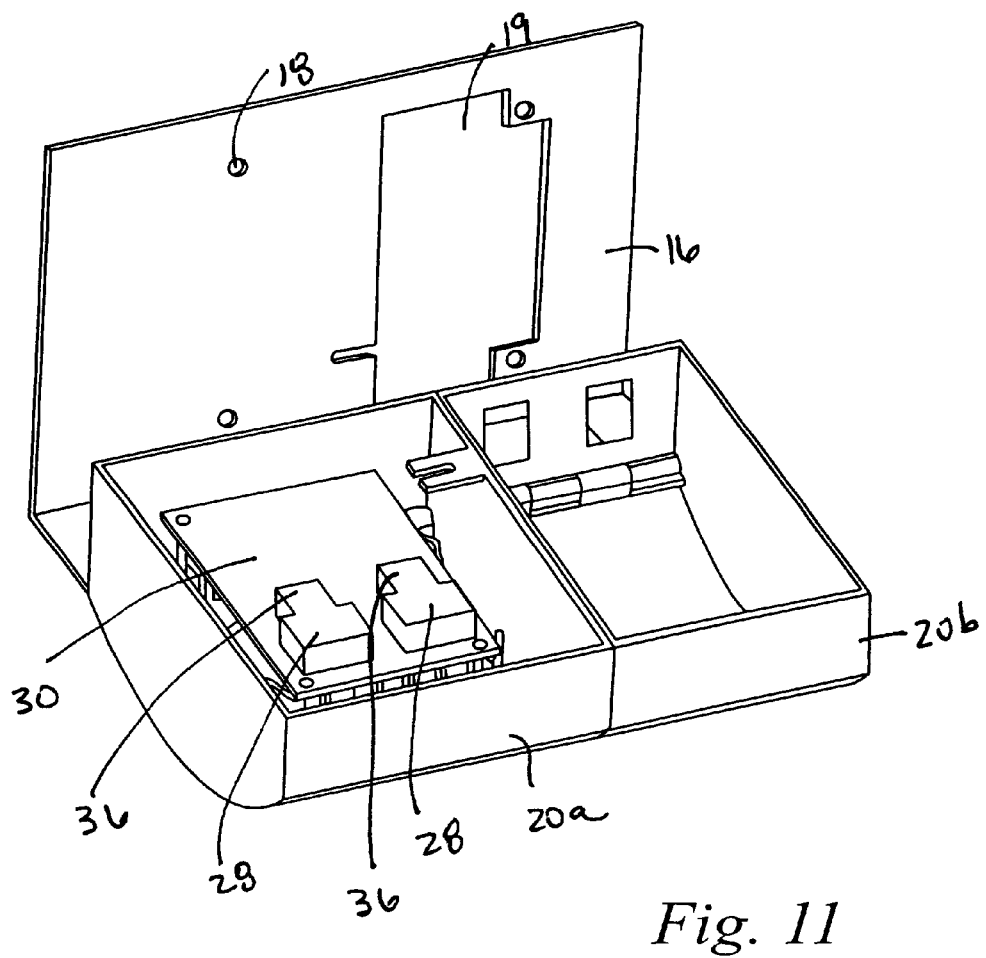
FIG. 11 is a perspective view of the mixed media outlet of FIG. 10 in which the cover has been opened to illustrate the active and passive sections.
Figure 12:
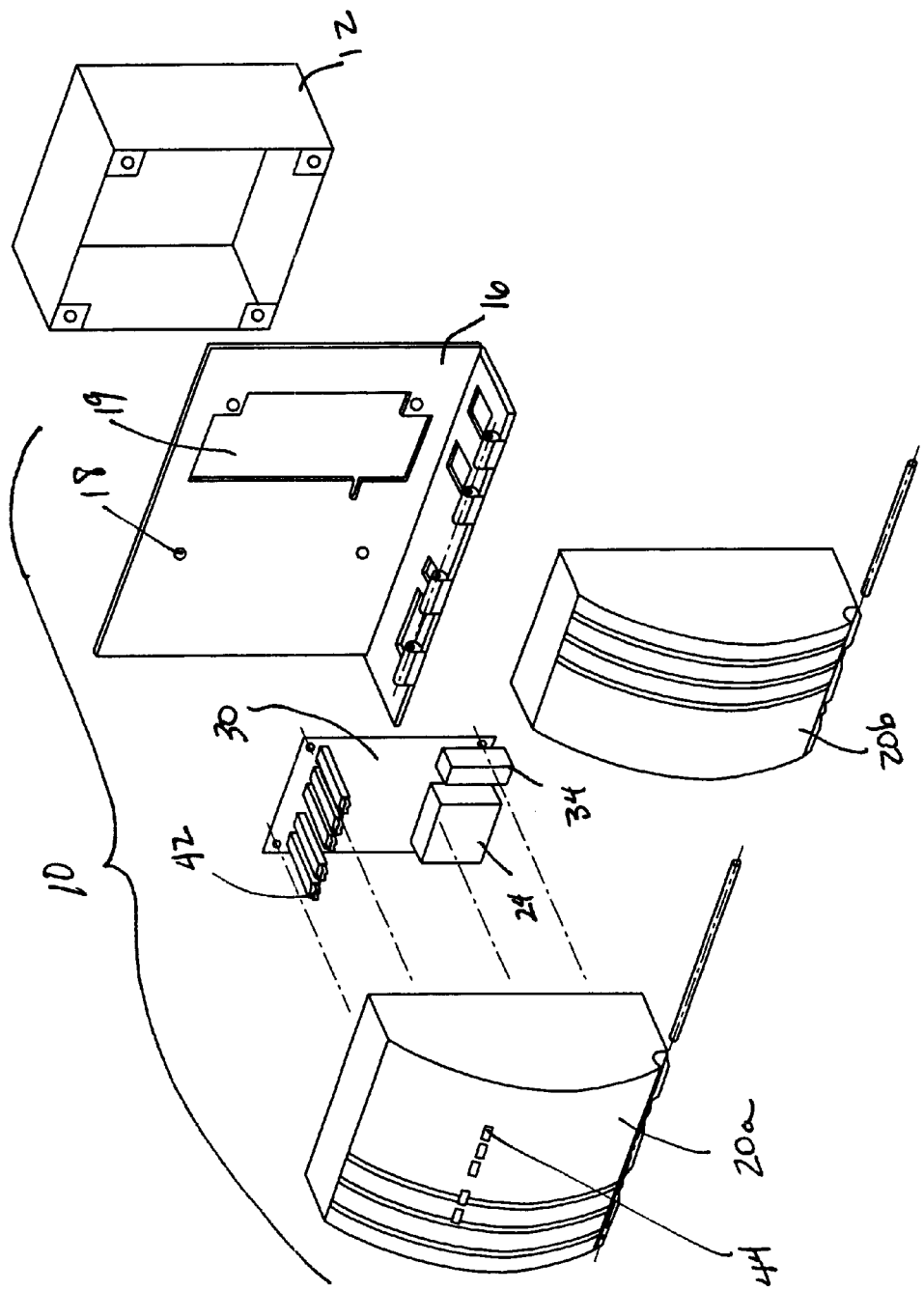
FIG. 12 is an exploded perspective view of the mixed media outlet of FIG. 10 that illustrates the first and second portions of the cover and the hinged connection of the first and second portions of the cover to the base.

In the embodiment depicted in FIGS. 10–12, the cover 20 is split into first and second portions 20a, 20b that separately cover the active section of the mixed media outlet 10 and the passive section of the mixed media outlet, respectively. While the first and second portions of the cover can be designed so as to be opened independently of one another, the first and second portions of the cover can be designed such that the first portion of the cover that encloses the active section of the mixed media outlet can only be opened once the second portion of the cover that encloses the passive section of the mixed media outlet has been opened. As such, the abutting edges of the first and second portions of the cover can have corresponding lips in which the lip of the second portion of the cover lies on top of the lip of the first portion of the cover such that the second portion of the cover must be opened before opening the first portion of the cover. As shown in FIGS. 10–12, the cover of this embodiment, including both the first and second portions of the cover, is preferably hinged to the base 16 such that the cover can be opened without further deconstructing the mixed media outlet.

While the mixed media outlet 10 has been described in conjunction with an embodiment that includes a single voice port 26 and a single data port 24, the mixed media outlet can include additional ports without departing from the spirit and scope of the present invention. For example, the mixed media outlet can include a pair of data ports and/or a pair of voice ports as shown in FIGS. 7–12. In those embodiments in which the mixed media outlet includes a plurality of data ports, the mixed media outlet also includes an electro-optic converter 28 capable of separately converting the signals transmitted and received by each data port. In addition, the mixed media outlet of these embodiments would also include additional fiber ports 36 for providing a point of connection with an optical fiber for each data port.

By including an electro-optic converter 28, the mixed media outlet 10 of the present invention permits an electronic device, such as a computer, to communicate with an optical network without having to install an optical network interface card within the computer and without having an external media converter. In particular, the mixed media outlet of the present invention includes ports for permitting a telephone to connect to either an electrical or an optical network and for a computer to connect to an optical network. As such, the mixed media outlet of one advantageous embodiment provides a common outlet for establishing connections to both an optical network and an electrical network. By being mounted upon the wall, the mixed media outlet of the present invention also provides an aesthetically pleasing appearance without creating a trip hazard or the like.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A mixed media outlet capable of being mounted upon a wall, the mixed media outlet comprising:
   a housing adapted to be wall mounted;
   first and second ports, disposed within an opening defined by said housing, for receiving respective electrical connectors, each port including a plurality of electrically conductive elements;
   an electro-optic converter positioned within said housing for converting between electrical and optical signals, said electro-optic converter disposed in electrical communication with at least some of the electrically conductive elements of said first port; and
   a fiber port, disposed within said housing and in optical communication with said electro-optic converter, for establishing communications between an optical fiber within the wall and at least some of the electrically conductive elements of said first port.

2. A mixed media outlet according to claim 1 wherein said second port is adapted to electrically connect conductive elements located within and outside of the wall.

3. A mixed media outlet according to claim 2 wherein said housing comprises:
   a base capable of being mounted to an electrical outlet box, said base defining an opening through which the optical fiber and a conductive element that are located within the wall enter the mixed media outlet; and
   a cover mounted to said base.

4. A mixed media outlet according to claim 3 wherein said base comprises at least one fiber guide for guiding the optical fiber from said fiber port to the opening defined by said base.

5. A mixed media outlet according to claim 4 wherein at least one side of both said base and said cover is curved to permit the optical fiber to be guided from said fiber port to the opening defined by said base without bending the optical fiber more sharply than a predetermined minimum bend radius.

6. A mixed media outlet according to claim 3 wherein said cover comprises first and second portions, the first portion of said cover enclosing an active section of the mixed media outlet including said first port, said electro-optic converter and said fiber port, the second portion of said cover enclosing a passive section of the mixed media outlet including said second port.

7. A mixed media outlet according to claim 1 further comprising a protective subhousing covering at least said electro-optic converter for protecting said electro-optic converter from electromagnetic interference, said protective subhousing defining openings through which said first port and said fiber port are exposed.

8. A mixed media outlet according to claim 7 wherein said protective subhousing is hingedly connected to at least a portion of said housing.

9. A mixed media outlet according to claim 1 further comprising a printed circuit board, wherein components including said first port, said electro-optic converter and said fiber port are mounted upon only one side of said printed circuit board.

10. A mixed media outlet according to claim 1 further comprising a printed circuit board, wherein components including said first port, said electro-optic converter and said fiber port are mounted upon first and second opposed sides of said printed circuit board.

11. A mixed media outlet according to claim 1 further comprising a power port for receiving electrical power from a source outside of the wall.

12. A mixed media outlet according to claim 1 further comprising a terminal block for establishing electrical connection with a conductive element within the wall that supplies electrical power.

13. A mixed media outlet capable of being mounted upon a wall, the mixed media outlet comprising:
   a housing adapted to be wall mounted;
   a voice port, disposed within an opening defined by said housing, for connecting voice transmission elements located within and outside of the wall and for passing voice signals therebetween;
   a data port, disposed within an opening defined by said housing, for establishing electrical connection with a conductive element capable of transmitting data signals; and
   an electro-optic converter positioned within said housing for converting between electrical and optical signals, said electro-optic converter interposed between the data port and an optical fiber within the wall such that the optical fiber and the conductive element that is capable of transmitting data signals can be interconnected.

14. A mixed media outlet according to claim 13 further comprising a fiber port, disposed within said housing and in optical communication with said electro-optic converter, for establishing communications between the optical fiber within the wall and the conductive element that is capable of transmitting data signals.

15. A mixed media outlet according to claim 13 wherein the voice transmission elements are optical fibers, and wherein said voice port connects the optical fibers located within and outside the wall for passing voice signals therebetween.

16. A mixed media outlet according to claim 13 wherein said voice port connects the voice transmission element outside of the wall with the same optical fiber within the wall that is also in communication with said electro-optic converter.

17. A mixed media outlet according to claim 13 wherein the voice transmission elements are conductive elements, and wherein said voice port connects the conductive elements located within and outside the wall for passing voice signals therebetween.

18. A mixed media outlet according to claim 13 wherein said housing comprises:
   a base capable of being mounted to an electrical outlet box, said base defining an opening through which the optical fiber and the conductive element that are located within the wall enter the mixed media outlet; and
   a cover mounted to said base.

19. A mixed media outlet according to claim 18 wherein said base comprises at least one fiber guide for guiding the optical fiber within the mixed media outlet to the opening defined by said base.

20. A mixed media outlet according to claim 19 wherein at least one side of both said base and said cover is curved to permit the optical fiber to be guided to the opening defined by said base without bending the optical fiber more sharply than a predetermined minimum bend radius.

21. A mixed media outlet according to claim 18 wherein said cover comprises first and second portions, the first portion of said cover enclosing an active section of the mixed media outlet including said data port and said electro-optic converter, the second portion of said cover enclosing a passive section of the mixed media outlet including said voice port.

22. A mixed media outlet according to claim 13 further comprising a protective subhousing covering at least said electro-optic converter for protecting said electro-optic converter from electromagnetic interference, said protective subhousing defining an opening through which said data port is exposed.

23. A mixed media outlet according to claim 22 wherein said protective subhousing is hingedly connected to at least a portion of said housing.

24. A mixed media outlet according to claim 13 further comprising a printed circuit board, wherein components including said data port and said electro-optic converter are mounted upon only one side of said printed circuit board.

25. A mixed media outlet according to claim 13 further comprising a printed circuit board, wherein components including said data port and said electro-optic converter are mounted upon first and second opposed sides of said printed circuit board.

26. A mixed media outlet according to claim 13 further comprising a power port for receiving electrical power from a source outside of the wall.

27. A mixed media outlet according to claim 13 further comprising a terminal block for establishing electrical connection with a conductive element within the wall that supplies electrical power.

28. A mixed media outlet capable of being mounted upon a wall, the mixed media outlet comprising:
   a housing adapted to be wall mounted;
   first and second ports, disposed within an opening defined by said housing, for receiving respective connectors;
   a fiber port, disposed within said housing, for establishing communications between an optical fiber within the wall; and
   an electro-optic converter positioned within said housing for converting between electrical signals received via at least one of said first and second ports and optical signals received via said fiber port,
   wherein said fiber port and at least one of said first and second ports are disposed in different imaginary planes.

29. A mixed media outlet according to claim 28 wherein said fiber port and at least one of said first and second ports are disposed in respective imaginary planes that intersect one another.

30. A mixed media outlet according to claim 28 wherein said housing comprises:
   a base capable of being mounted to an electrical outlet box, said base defining an opening through which the optical fiber and a conductive element that are located within the wall enter the mixed media outlet; and
   a cover mounted to said base.

31. A mixed media outlet according to claim 28 further comprising a protective subhousing covering at least said electro-optic converter for protecting said electro-optic converter from electromagnetic interference, said protective subhousing defining openings through which said first port and said fiber port are exposed.

32. A mixed media outlet according to claim 28 further comprising a printed circuit board, wherein components including said first port, said electro-optic converter and said fiber port are mounted upon said printed circuit board, and wherein said first port and said fiber port are mounted upon opposed sides of said printed circuit board.

33. An outlet capable of being mounted upon a wall, the outlet comprising:
   a housing adapted to be wall mounted;
   first and second ports, disposed within an opening defined by said housing, for receiving respective connectors;
   an electro-optic converter positioned within said housing for converting between electrical and optical signals, said electro-optic converter interposed between the first port and an optical fiber within the wall such that the optical fiber and at least some electrically conductive elements of said first port can be interconnected; and
   a protective subhousing covering at least said electro-optic converter for protecting said electro-optic converter from electromagnetic interference.

34. An outlet according to claim 33 further comprising a fiber port, disposed within said housing and in optical communication with said electro-optic converter, for establishing communications between the optical fiber within the wall and at least some of the conductive elements of said first port.

35. An outlet according to claim 33 wherein said second port is adapted to electrically connect conductive elements located within and outside of the wall.

36. An outlet according to claim 35 wherein said housing comprises:
   a base capable of being mounted to an electrical outlet box, said base defining an opening through which the optical fiber and the conductive elements that are located within the wall enter the mixed media outlet; and
   a cover mounted to said base.

37. An outlet according to claim 36 wherein said base comprises at least one fiber guide for guiding the optical fiber within the mixed media outlet to the opening defined by said base.

38. An outlet according to claim 37 wherein at least one side of both said base and said cover is curved to permit the optical fiber to be guided to the opening defined by said base without bending the optical fiber more sharply than a predetermined minimum bend radius.

39. An outlet according to claim 36 wherein said cover comprises first and second portions, the first portion of said cover enclosing an active section of the mixed media outlet including said first port and said electro-optic converter, the second portion of said cover enclosing a passive section of the mixed media outlet including said second port.

40. An outlet according to claim 33 wherein said protective subhousing is hingedly connected to at least a portion of said housing.

41. An outlet according to claim 33 further comprising a printed circuit board, wherein components including said first port and said electro-optic converter are mounted upon only one side of said printed circuit board.

42. An outlet according to claim 33 further comprising a printed circuit board, wherein components including said first port and said electro-optic converter are mounted upon first and second opposed sides of said printed circuit board.

43. An outlet according to claim 33 further comprising a power port for receiving electrical power from a source outside of the wall.

44. An outlet according to claim 33 further comprising a terminal block for establishing electrical connection with a conductive element within the wall that supplies electrical power.

* * * * *